(12) United States Patent
Sun

(10) Patent No.: US 9,311,723 B2
(45) Date of Patent: Apr. 12, 2016

(54) ATTENUATION CORRECTION METHOD AND DEVICE FOR IMAGE IN PET SYSTEM

(75) Inventor: Zhipeng Sun, Shenyang (CN)

(73) Assignee: NEUSOFT POSITRON MEDICAL SYSTEMS CO., LTD. SHENYANG, Shenyang (CN)

( * ) Notice: Subject to any disclaimer, the term of this patent is extended or adjusted under 35 U.S.C. 154(b) by 11 days.

(21) Appl. No.: 14/359,108

(22) PCT Filed: Apr. 26, 2012

(86) PCT No.: PCT/CN2012/074736
§ 371 (c)(1),
(2), (4) Date: May 19, 2014

(87) PCT Pub. No.: WO2013/097390
PCT Pub. Date: Jul. 4, 2013

(65) Prior Publication Data
US 2014/0328532 A1 Nov. 6, 2014

(30) Foreign Application Priority Data
Dec. 30, 2011 (CN) .......................... 2011 1 0455239

(51) Int. Cl.
| | |
|---|---|
| G06K 9/00 | (2006.01) |
| G06T 11/00 | (2006.01) |
| G06T 5/00 | (2006.01) |
| A61B 6/00 | (2006.01) |
| A61B 5/05 | (2006.01) |

(52) U.S. Cl.
CPC .............. *G06T 11/005* (2013.01); *G06T 5/005* (2013.01); *G06T 2207/10104* (2013.01); *G06T 2207/20004* (2013.01); *G06T 2207/30004* (2013.01)

(58) Field of Classification Search
CPC ............. G06T 7/00; G06T 11/00; G06K 9/00
USPC .............. 382/128–134; 378/4, 8, 21–27, 101, 378/901; 600/321, 425, 436
See application file for complete search history.

(56) References Cited

U.S. PATENT DOCUMENTS

| | | | | |
|---|---|---|---|---|
| 6,856,666 B2* | 2/2005 | Lonn | ..................... | A61B 6/032 378/19 |
| 7,378,660 B2* | 5/2008 | Case | .................... | G01T 1/1611 250/363.01 |

(Continued)

FOREIGN PATENT DOCUMENTS

| | | |
|---|---|---|
| CN | 1903128 A | 1/2007 |
| CN | 101690418 A | 3/2010 |
| CN | 101953693 A | 1/2011 |

OTHER PUBLICATIONS

International Search Report for PCT/CN2012/074736.

*Primary Examiner* — Abolfazl Tabatabai
(74) *Attorney, Agent, or Firm* — Kilpatrick Townsend & Stockton LLP

(57) ABSTRACT

An attenuation correction method and device for an image in a PET system. The method includes: acquiring transmission scanning sinogram data from a PET apparatus; reconstructing the transmission scanning sinogram data with Bayesian model-based Ordered Subset Expectation Maximization (OSEM-B) algorithm and Filtered Back Projection (FBP) algorithm, to obtain an OSEM-B attenuation image and a first FBP attenuation image respectively; performing a weighted calculation on the OSEM-B attenuation image and the first FBP attenuation image to obtain an effective attenuation image; and performing attenuation correction on emission scanning sinogram data from the PET apparatus by using an attenuation sinogram generated based on the effective attenuation image.

10 Claims, 6 Drawing Sheets

(56) References Cited

U.S. PATENT DOCUMENTS 8,098,916 B2 * 1/2012 Thielemans ........... A61B 6/032 382/131

2009/0201291 A1 * 8/2009 Ziv ........................ A61B 5/055 345/424

* cited by examiner

ATTENUATION CORRECTION METHOD AND DEVICE FOR IMAGE IN PET SYSTEM

This application is the US national phase of International Application No. PCT/CN2012/074736 filed on Apr. 26, 2012, which claims the benefit of priority to Chinese patent application No. 201110455239.4 titled "ATTENUATION CORRECTION METHOD AND DEVICE FOR IMAGE IN PET SYSTEM", filed with the Chinese State Intellectual Property Office on Dec. 30, 2011, which are incorporated herein by reference in their entireties.

TECHNICAL FIELD

The present invention relates to the field of medical image processing, and in particular to an attenuation correction method for a medical image in a PET system and a device thereof.

BACKGROUND

When a Positron Emission Computed Tomography (PET) apparatus performs a scanning, each patient generally has to be scanned twice, with one scanning being the emission scanning and the other scanning being the transmission scanning. Data collected in the emission scanning substantially reflects distribution of a drug in the patients body. Since an attenuation correction is not performed on the data, the quantification is inaccurate. Data collected in the transmission scanning is specially used to generate an attenuation sinogram to perform the attenuation correction on the data obtained in the emission scanning. When the PET apparatus performs a cardiac examination, the data obtained in the emission scanning may reflect the distribution of the drug in the patient's body and the emission scanning takes approximately 4 minutes. Moreover, the transmission scanning takes approximately 30 minutes in order to obtain a relatively accurate scanning image.

According to the attenuation correction method in the prior art, Segmented Attenuation Correction (SAC) method is used to reduce the time spent on the transmission scanning and obtain a relatively accurate image. In this method, Filtered Back Projection (FBP) reconstruction is firstly performed on the data collected in the transmission scanning. The obtained FBP reconstruction image is divided into a tissue region, a lung region, a bed board region and an air region according to pixel values of the image. The four regions have four different densities respectively, and denote four different attenuation coefficients. Corresponding values are assigned to pixels of image the each of the regions. Then the forward projection is performed on the assigned image. A thus obtained attenuation sinogram is used in the attenuation correction performed on the data obtained by the emission scanning.

However, in the above attenuation correction method, the scan for one patient may have to last more than 10 minutes. Moreover, it may take even more than 1 hour to scan the whole body of a patient. Therefore, the efficiency of the attenuation correction for the medical image obtained by the PET apparatus scanning is still low. As a result, it is desired to propose an innovative attenuation correction method for a medical image, so as to ensure the precision of the image after the attenuation correction with the time spent by the transmission scanning being reduced, improve the input-output ratio of the apparatus and reduce psychological and physiological discomfort of the patient due to the scanning.

SUMMARY

An object of the embodiments of the present invention is to provide an attenuation correction method for a medical image in a PET system, so as the precision of the image after the attenuation correction in the case that the time spent on the transmission scanning is reduced.

Another object of the embodiments of the present invention is to apply the above-mentioned method into a specific application to provide an attenuation correction device for a medical image in a PET system, so that the method is implemented and applied.

In order to achieve the above-mentioned objects, according to an embodiment of the present invention, it is provided an attenuation correction method for an image in a positron emission computed tomography (PET) system, which includes:

acquiring transmission scanning sinogram data from a PET apparatus;

reconstructing the transmission scanning sinogram data with Bayesian model-based Ordered Subset Expectation Maximization (OSEM-B) algorithm and Filtered Back Projection (FBP) algorithm, to obtain an OSEM-B attenuation image and a first FBP attenuation image respectively;

performing a weighted calculation on the OSEM-B attenuation image and the first FBP attenuation image to obtain an effective attenuation image; and performing attenuation correction on emission scanning sinogram data from the PET apparatus by using an attenuation sinogram generated based on the effective attenuation image.

Preferably, performing a weighted calculation on the OSEM-B attenuation image and the first FBP attenuation image to obtain an effective attenuation image includes:

calculating the effective attenuation coefficient of the effective attenuation image by using a formula $\mu^{Final} = \alpha \mu^{OSEM-B} + (1-\alpha)\mu^{FBP}$, where $\mu^{OSEM-B}$ denotes the attenuation coefficient of the OSEM-B attenuation image, $\mu^{FBP}$ denotes the attenuation coefficient of the FBP attenuation image and $\alpha$ denotes a weighting parameter.

Preferably, obtaining $\alpha$ includes:

obtaining sinogram data in performing transmission scanning for inherent noise of the current PBT apparatus before a delivery, and performing an PEP reconstruction on the sinogram data obtained in the noise scanning, to obtain a second FBP attenuation image;

extracting a first tissue region from the effective attenuation image and a second tissue region from the second FBP attenuation image; and calculating $\alpha$ by using a histogram of the first tissue region and a histogram of the second tissue region.

Preferably, calculating $\alpha$ by using a histogram of the first tissue region and a histogram of the second tissue region includes:

calculating $\alpha$ by using a minimum mean square error calculation formula $$\alpha = \min_{\alpha} \|\text{Hist}_{Final} - \text{Hist}_{Long}\|,$$

where $\text{Hist}_{Final}$ denotes the histogram of the first tissue region and $\text{Hist}_{Long}$ denotes the histogram of the second tissue region.

Preferably, reconstructing the transmission scanning sinogram data with OSEM-B algorithm includes:

obtaining a primary attenuation coefficient $\mu_j^{new\_part}$ of a primary attenuation image of the transmission scanning sinogram data with Ordered Subset Expectation Maximization (OSEM) algorithm; and combining the primary attenuation coefficient $\mu_j^{new\_part}$ with a Bayesian model $\alpha_j$ according to a formula $\mu_j^{new}=(1-\alpha_j)\mu_j^{new\_part}+\alpha_j\mu_{water}$, to obtain a attenuation coefficient of the OSEM-B attenuation image;

where $\mu_{water}$ denotes the attenuation coefficient of water.

According to the embodiments of the present invention, it is further provided an attenuation correction device for an image in a Positron Emission computed Tomography (PET) system, which includes:

an original data acquiring module, configured to acquire transmission scanning sinogram data from a PET apparatus;

a Bayesian model-based Ordered Subset Expectation Maximization (OSEM-B) reconstruction module, configured to reconstruct the transmission scanning sinogram data with OSEM-B algorithm, to obtain an OSEM-B attenuation image;

a Filtered Back Projection (FBP) reconstruction module, configured to reconstruct the transmission scanning sinogram data with FBP algorithm, to obtain a first FBP attenuation image;

a weighted calculation module, configured to perform weighted calculation on the OSEM-B attenuation image and the first FBP attenuation image to obtain an effective attenuation image; and an attenuation correction module, configured to perform attenuation correction on emission scanning sinogram data from the current PET apparatus by adopting an attenuation sinogram generated based on the effective attenuation image.

Preferably, the weighted calculation module is configured to:

calculate the effective attenuation coefficient of the effective attenuation image by using a formula $\mu^{Final}=\alpha\mu^{OSEM-B}+(1-\alpha)\mu^{FBP}$, where $\mu^{OSEM-B}$ denotes the attenuation coefficient of the OSEM-B attenuation image, $\mu^{FBP}$ denotes the attenuation coefficient of the FBP attenuation image and $\alpha$ denotes a weighting parameter Preferably, modules configured to obtain $\alpha$ include:

a obtaining module, configured to obtain sinogram data in performing transmission scanning for inherent noise of the current PET apparatus before a delivery, and perform an FBP reconstruction on the sinogram data obtained in performing transmission scanning for the inherent noise, to obtain a second FBP attenuation image;

an extracting module, configured to extract a first tissue region from the effective attenuation image and a second tissue region from the second FBP attenuation image; and a calculation module, configured to calculate $\alpha$ by using a histogram of the first tissue region and a histogram of the second tissue region.

Preferably, the calculation module is configured to calculate $\alpha$ by using a minimum mean square error calculation formula $$\alpha = \min_{\alpha}\|Hist_{Final} - Hist_{Long}\|,$$

where $Hist_{Final}$ denotes the histogram of the first tissue region and $Hist_{Long}$ denotes the histogram of the second tissue region.

Preferably, the OSEM-B reconstruction module includes;

a first obtaining sub-module, configured to obtain a primary attenuation coefficient $\mu_j^{new\_part}$ of a primary attenuation image of the short-time transmission scanning sinogram data with Ordered Subset Expectation Maximization (OSEM) algorithm; and a second obtaining sub-module, configured to obtain the attenuation coefficient of the OSEM-B attenuation image by combining the primary attenuation coefficient $\mu_j^{new\_part}$ with a Bayesian model $\alpha_j$ according to a formula $\mu_j^{new}=(1-\alpha_j)\mu_j^{new\_part}+\alpha_j\mu_{water}$;

where $\mu_{water}$ denotes the attenuation coefficient of water.

As can be seen from the above-mentioned technical solution, in the embodiments of the present invention, the short-time transmission scanning sinogram data is reconstructed with FBP algorithm and OSEM-B algorithm respectively, and an effective attenuation coefficient is obtained by performing a weighted calculation on the two reconstruction results. By performing the attenuation correction on the emission scanning sinogram data with the effective attenuation coefficient, the quality of the attenuation image is approximately same as that of the attenuation image which is obtained by performing segmented attenuation correction on a long-time transmission scanning sinogram data, and reducing the time spent on the transmission scanning. For example, according to the embodiments of the invention, the transmission scanning only has to last for 4 minutes, and the precision of the image after the attenuation correction reaches that of the image obtained by performing segmented attenuation correction on transmission scanning chordal data which is acquired by performing 8-minute transmission scanning.

BRIEF DESCRIPTION OF THE DRAWINGS

The accompanying drawings used in the description of the embodiments or the prior art will be described briefly as follows, so that the technical solutions according to the embodiments of the present invention or according to the prior art will become more apparent. It is clear that the accompanying drawings in the following description are only some embodiments of the present invention. For those skilled in the art, other accompanying drawings may be obtained according to these accompanying drawings without any inventive efforts.

DETAILED DESCRIPTION

In order that the skilled in the art can understand better the solution of the present invention, the technical solution according to the embodiments of the present invention will be described clearly below in conjunction with the drawings. It is clear that the described embodiments are only some of the embodiments of the present invention. Other embodiments obtained by those skilled in the art based on the embodiments in the present invention without any inventive efforts falls within the scope of the present invention.

Figure 1:
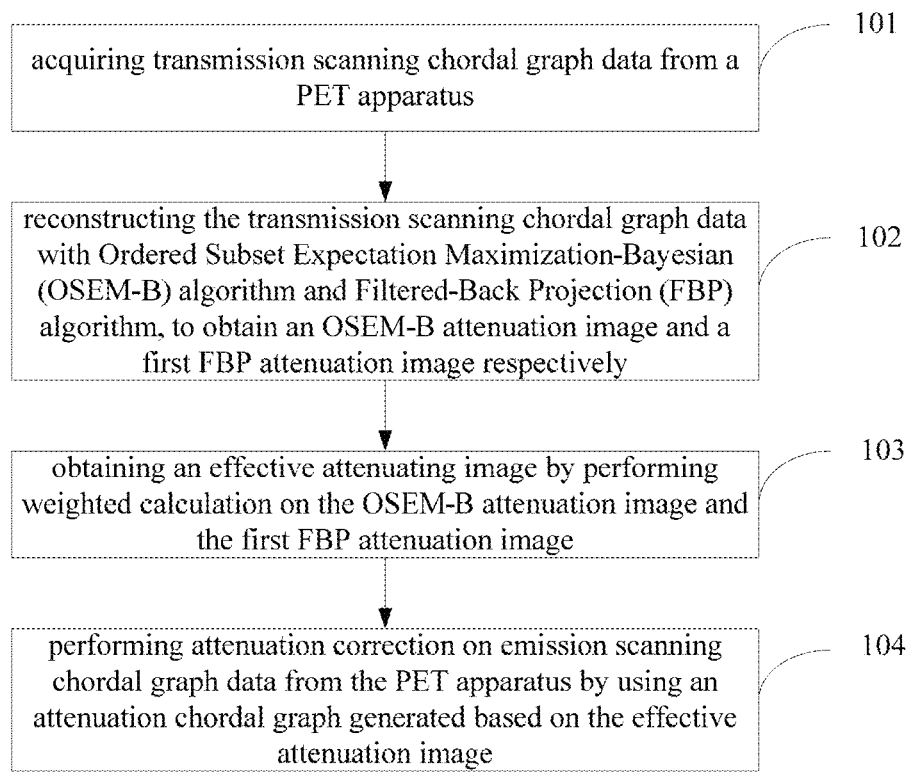
FIG. 1 is a flow chart illustrating a method according to an embodiment of the invention.

FIG. 1 shows a flow chart of an attenuation correction method for a medical image in a PET system according to the present invention. The attenuation correction method may include step 101 to step 104.

In step 101: acquiring transmission scanning sinogram data from a PET apparatus.

In the embodiment of the invention, attenuation correction is performed on transmission scanning sinogram data from a PET apparatus. The transmission scanning sinogram data is acquired after the PET apparatus performs a transmission scanning. In this embodiment, the scanning sinogram data in this step may be acquired by a short-time transmission scanning. For example, the transmission scanning may last for only 4 minutes.

In step 102: reconstructing the transmission scanning sinogram data with Ordered Subset Expectation Maximization-Bayesian (OSEM-B) algorithm and Filtered-Back Projection (FBP) algorithm, to obtain an OSEM-B attenuation image and a first FBP attenuation image respectively.

The embodiment differs from the prior art lies in that, the transmission scanning sinogram data is not only reconstructed with FBP algorithm but also reconstructed with OSEM-B algorithm.

Figure 2:
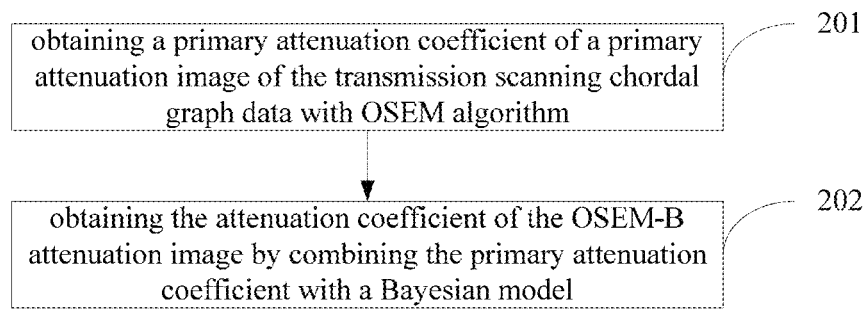
FIG. 2 is a flow chart illustrating OSEM-B reconstruction of a method according to an embodiment of the present invention.

OSEM-B algorithm is an iterative algorithm which is usually used in emission reconstruction and Transmission reconstruction. According to the algorithm, an exact and uniform attenuation image may be obtained by using forward and backward projections in combination with a Bayesian model constraint. As shown in FIG. 2, the reconstructing the transmission scanning sinogram data with OSEM-B algorithm in this step may include steps 201 to 202.

In step 201: obtaining a primary attenuation coefficient $\mu_j^{new\_part}$ of a primary attenuation image of the transmission scanning sinogram data with OSEM algorithm.

OSEM-B algorithm described in this embodiment includes two steps. Firstly, calculation on the transmission scanning sinogram data is performed with OSEM algorithm. Then, the calculation result is combined with the Bayesian model. The calculation with OSEM algorithm is as shown in Formula (1):

$$\mu_j^{new\_part} = \frac{\mu_j^{old}}{\sum_{i \in S_i} l_{ij}} \sum_{i \in S_i} l_{ij} \frac{y_i}{\sum_k l_{ik} \mu_k^{old}} \quad (1)$$

where $\mu$ denotes the primary attenuation coefficient of the primary attenuation image, y denotes a attenuation value of a response line. l denotes the length of a line segment that a response line passes through a pixel, i.e., the length of the line segment that response line i overlaps pixel 1. S denotes a degree subset, and the subscripts i and j respectively denote a certain response line and a certain pixel. Where, the response line refers to a connection line between a pair of pixels. For example, the attenuation value along a response line is 1-00, if the pixel values of image pixels along the response line reduces from 100 to 90. The angle subset refers to sub-sets of the image in all directions. For example, if the image has 256 projections in different directions and there are 8 sub-sets, one sub-set has 32 projections. Moreover, in Formula (1), $\mu_j^{old}$ denotes the iteration result of the last reconstruction, y may denote a measured value and l denotes a system matrix.

In step 202: obtaining the attenuation coefficient of the OSEM-B attenuation image by combining the primary attenuation coefficient $\mu_j^{new\_part}$ with a Bayesian model $\alpha_j$ according to a formula $\mu_j^{new} = (1+\alpha_j)\mu_j^{new\_part} + \alpha_j \mu_{water}$, where $\mu_{water}$ is the attenuation coefficient of water.

In this embodiment, the Bayesian model is as shown in Formula (2):

$$\alpha_j = \alpha_0 \exp[-(\mu_j^{old} - \mu_{water})^2/\beta^2] \quad (2)$$

where Formula (2) is a model similar to Gaussian function. Where $\alpha_0 \in [0,1]$ is a parameter. It can be seen that the closer $\mu_j^{old}$ is to $\mu_{water}$, the closer $\alpha_j$ is to $\alpha_0$.

The photon energy of the PET apparatus is 511 KeV, in an attenuation image, except for the lung and bone, the attenuation coefficient of the phone in other part is close to that of the water, OSEM algorithm may be combined with the Bayesian model according to Formula (3):

$$\mu_j^{new} = (1-\alpha_j)\mu_j^{new\_part} + \alpha_j \mu_{water} \quad (3)$$

the attenuation coefficient of the OSEM-B attenuation image reconstructed by using the OSEM-B algorithm can be obtained according to Formula (3). However, the attenuation coefficient can not be directly used for the attenuation correction, because the attenuation value of the tissue region in OSEM-B attenuation image is too smooth, but there is fluctuation on the attenuation value of the normal human body. Since the attenuation value calculated according to Formula (3) does not fluctuate, it is possible to lost many image details generated due to the system noise and the correction algorithm. Hence, the noise distribution in the transmission scanning image does not match that in the emission scanning. The system noise may be amplified in the case where the attenuation correction is performed on the emission scanning sinogram data by directly using Formula (3).

In practice, many noises exist in the sinogram data collected by the PET apparatus, which results in a system characteristic that the sinogram data is not very uniform. After the excessive smoothing process is performed according to Formula (3), there may be an inconsistency between the distribution of the transmission sinogram data and that of the emission sinogram data. The quantization for the image may not be accurate or there may be artifacts in the image if the attenuation coefficient calculated with Formula (3) is directly used for the attenuation correction. Therefore, a weighted calculation in Step 103 is performed to reduce the system noise and obtain a more accurate attenuation coefficient.

In step 103: obtaining an effective attenuating image by performing weighted calculation on the OSEM-B attenuation image and the first FBP attenuation image.

In this step, the effective attenuation coefficient of the effective attenuation image is obtained by performing weighted calculation on the OSEM-B reconstruction result and the FBP reconstruction result according to Formula (4):

$$\mu^{Final} = \alpha\mu^{OSEM-B} + (1-\alpha)\mu^{FBP} \quad (4)$$

where $\mu^{OSEM-B}$ denotes the attenuation coefficient of the OSEM-B attenuation image, $\mu^{FBP}$ denotes the attenuation coefficient of the FBP attenuation image, $\alpha$ denotes a weighting parameter, and $\mu^{Final}$ denotes the effective attenuation coefficient.

The value of $\alpha$ ranges from 0 to 1. Since many noises exist in the FBP attenuation image, $\mu^{Final}$ is preferably closer to $\mu^{OSEM-B}$ to reduce the noises generated. Therefore, $\alpha$ may be a decimal close to 1.

Figure 3:
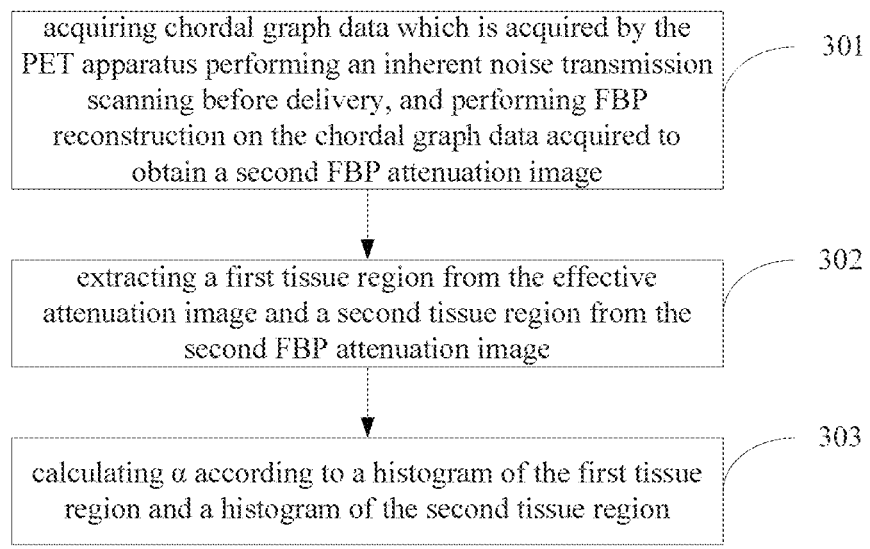
FIG. 3 is a flow chart illustrating Step 103 of a method according to an embodiment of the present invention.

Referring to FIG. 3, the α may be obtained by performing steps 301 to 303.

In step 301: acquiring sinogram data which is acquired by the PET apparatus performing an inherent noise transmission scanning before delivery, and performing FBP reconstruction on the sinogram data acquired to obtain a second FBP attenuation image.

According to the embodiments of the present invention, it is provided an adaptive selection method to select the parameter α for the weighted calculation. Since the PET apparatus is relatively complex, and the system noise distribution of each PET apparatus is different, each PET apparatus needs to perform a long-time inherent noise transmission scanning before delivery. Then the second FBP attenuation image may be obtained by performing the FBP reconstruction on the sinogram data.

In step 302: extracting a first tissue region from the effective attenuation image and a second tissue region from the second FBP attenuation image.

During each short-time transmission scanning in step 101, the tissue region may be extracted from the effective attenuation image and the second FBP attenuation image.

In step 303: calculating α according to histogram of the first tissue region and a histogram of the second tissue region.

The histograms $Hist_{Final}$ and $Hist_{Long}$ of the tissue regions in the two images are obtained respectively. In an image, the histogram of a region is wider if more noises distribute in the region. Therefore, in order to make the effective attenuation image to be similar to the second FBP attenuation image, an objective function shown as Formula (5) is established:

$$\alpha = \min_{\alpha} \|Hist_{Final} - Hist_{Long}\| \quad (5)$$

where $Hist_{Final}$ denotes the histogram of the first tissue region and $Hist_{Long}$ denotes the histogram of the second tissue region.

A minimum mean square error fitting method is adopted in Formula (5). $Hist_{Final}$ in Formula (5) and $\mu^{Final}$ in Formula (4) are both parameters related to the effective attenuation image. Therefore, the characteristic of the effective attenuation image may be eliminated by combining Formula (4) and Formula (5), and the value of α can be obtained.

In step 104: performing attenuation correction on emission scanning sinogram data from the PET apparatus by using an attenuation sinogram generated based on the effective attenuation image.

If the effective attenuation coefficient of the effective attenuation image is obtained in step 103, the effective attenuation sinogram may be generated by performing forward projection on the effective attenuation coefficient and then the attenuation correction is performed on emission scanning sinogram data from the PET apparatus by using the effective attenuation sinogram.

In the embodiments of the present invention, the weighted calculation on the OSEM-B attenuation image and the FBP attenuation image is performed to obtain the effective attenuation coefficient $\mu^{Final}$, and the attenuation correction is performed by using the effective attenuation coefficient $\mu^{Final}$. In this way, even if the time spent on transmission scanning in step 101 is short (8 minutes in the prior art, and only 4 minutes in the embodiments of the present invention), the system noise of the emission scanning sinogram data on which the attenuation correction is performed may be lower, and the image precision in the embodiment of the present invention may be close to that in the prior art in which the transmission scanning lasts for 8 minutes, according to the weighted calculation provided in the embodiments of the present invention, the object that the result of attenuation correction to short-time transmission scanning sinogram data is approximately same as that to long-time transmission scanning sinogram data can be achieved.

Figure 4:
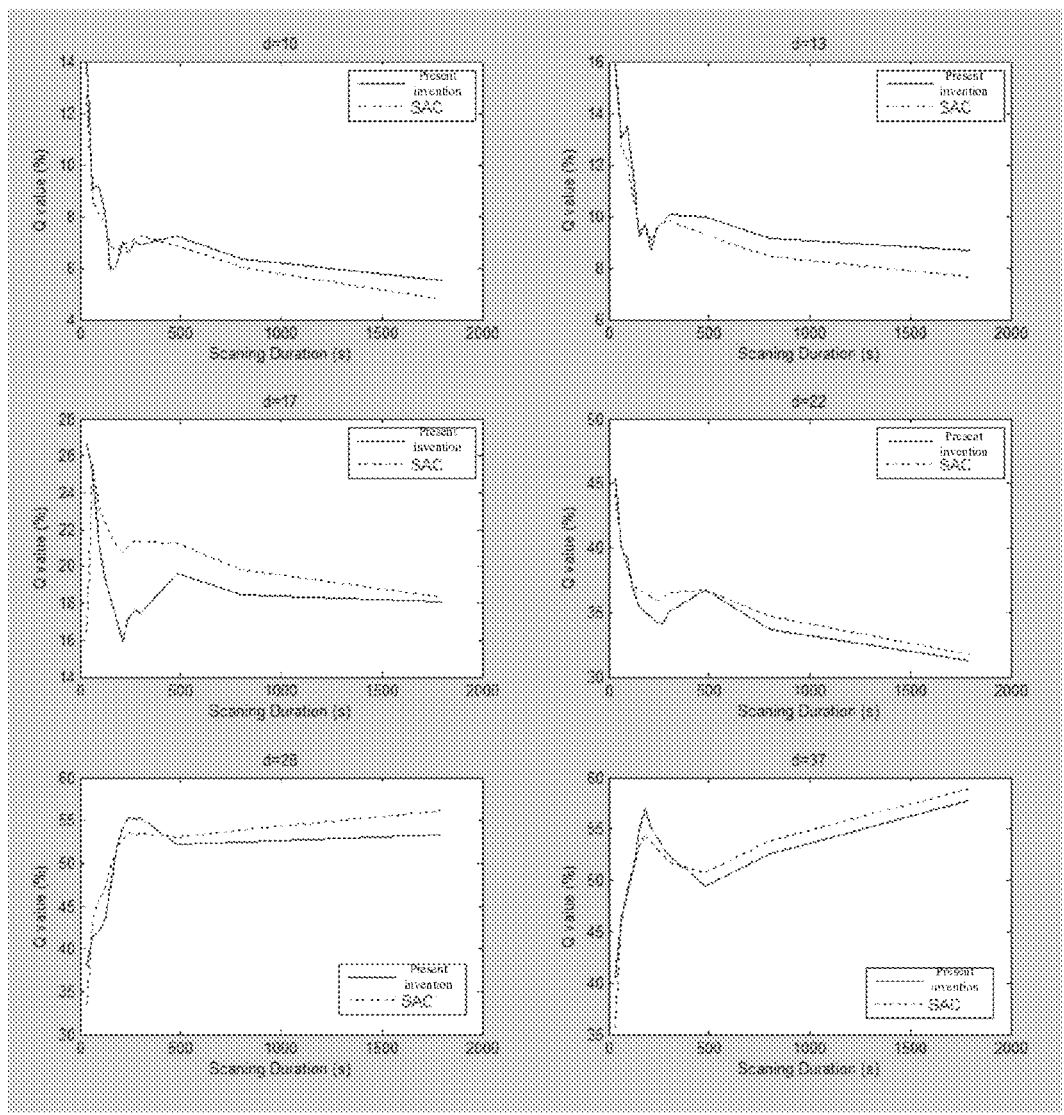
FIG. 4 are schematic diagrams illustrating image quality graphs in an NEMA (National Electrical Manufacturers Association) test.

In order to verify the advantages of the embodiments of the present invention compared with the SAC method in the prior art, a NEMA (National Electrical Manufacturers Association) test is respectively performed on the present method and the SAC method with same-time transmission scanning sinogram data, and it is provided schematic diagrams of effects of the test as follows. FIG. 4 are schematic diagrams of image quality in the NEMA test. In FIG. 4, the abscissa denotes the time spent on transmission scanning and the ordinate denotes the quality value, the solid line denotes the graph for the embodiment of the invention, and the dotted line denotes the graph for the SAC method in the prior art. Furthermore, d denotes the diameter of the heat source of the meninx, and six graphs in which d is respectively 10, 13, 17, 22, 28 and 37 are provided. As can be seen from FIG. 4, if the diameter of the heat source of the meninx is larger than the resolution of the PET, the quality of the image reconstructed for short-time scanning data with the embodiment of the present invention is better than that with SAC method.

Figure 5:
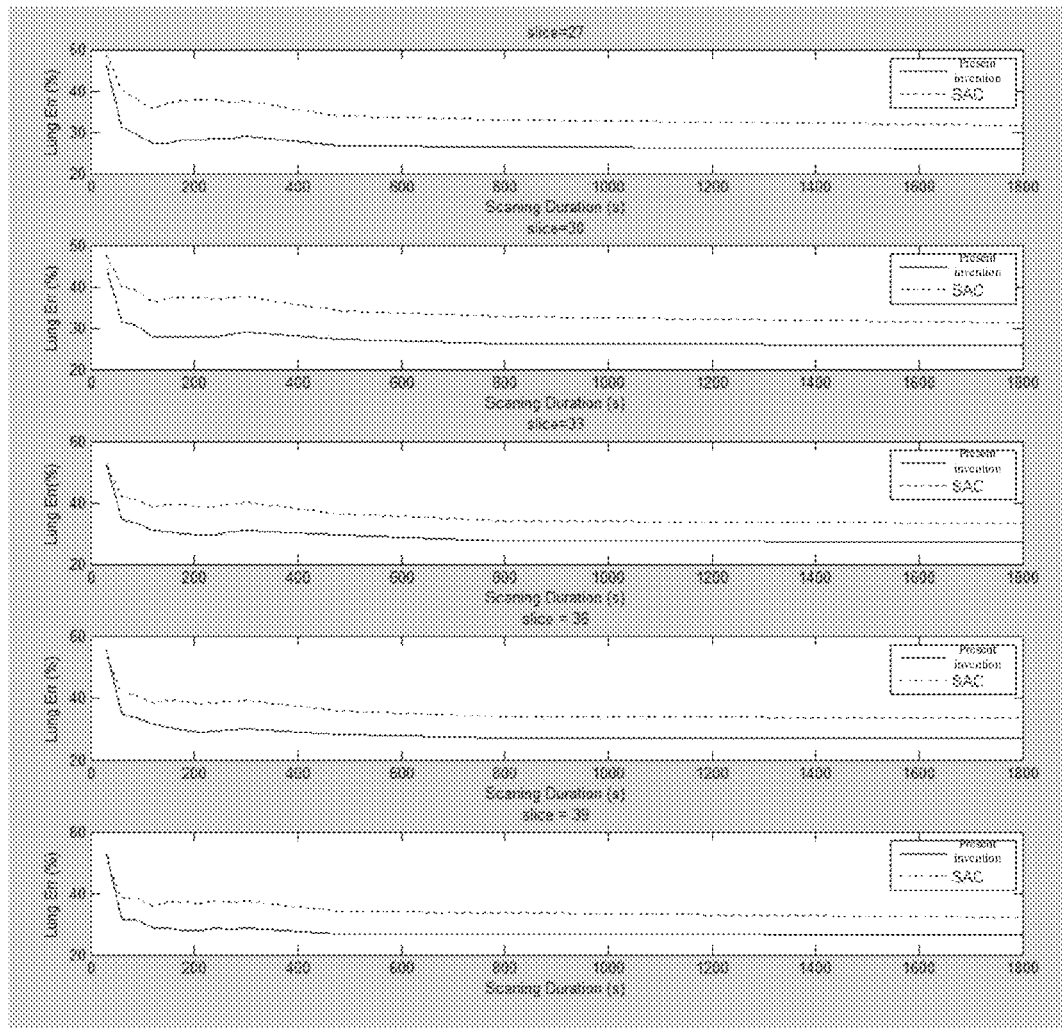
FIG. 5 are schematic diagrams illustrating lung error rate graphs in the NEMA test.

FIG. 5 are schematic diagrams of lung error rate graphs in the NEMA test. The lung is a cold region, and there is no medicine distributed. Moreover, it can be seen from the technical solution of the present invention that the lower the lung non-error rate graph is, the better the effect is. In FIG. 5, the abscissa denotes the time spent on transmission scanning and the ordinate denotes the lung error rate. The lung error rate graphs for the image slice Nos. 27, 30, 33, 36 and 29 after the attenuation correction are shown in FIG. 5. As can be seen from FIG. 5, the lung error rate in the case where the attenuation correction is performed according to the embodiments of the invention is significantly lower than that according to SAC method in the prior art. Furthermore, the lung error rate in the case where the attenuation correction is performed on 200-second transmission scanning data according to the embodiment of the invention is significantly better than that of the long-time scanning data in the case of the SAC method in the prior art.

From the above-mentioned embodiments of the method, the skilled in the ad can clearly understand that the present invention may be implemented by software in cooperation with a necessary universal hardware platform. Of course, the present invention can also be implemented by hardware in cooperation with a necessary universal hardware platform. However, in many cases, the former is preferable. Based on this understanding, the essence of the technical solution of the present invention or the part of the present invention contributing to the prior art may be embodied in the form of a software product. The software product is stored in a storage medium and includes a number of instructions to control a computer device (which may be a personal computer, a server, a network device and so on) to perform all or a part of steps in the method of the embodiment according the present invention. The above-mentioned storage medium includes a medium capable of storing program code, such as a read only memory (ROM), a random access memory (RAM), a magnetic disk and an optical disk.

Figure 6:
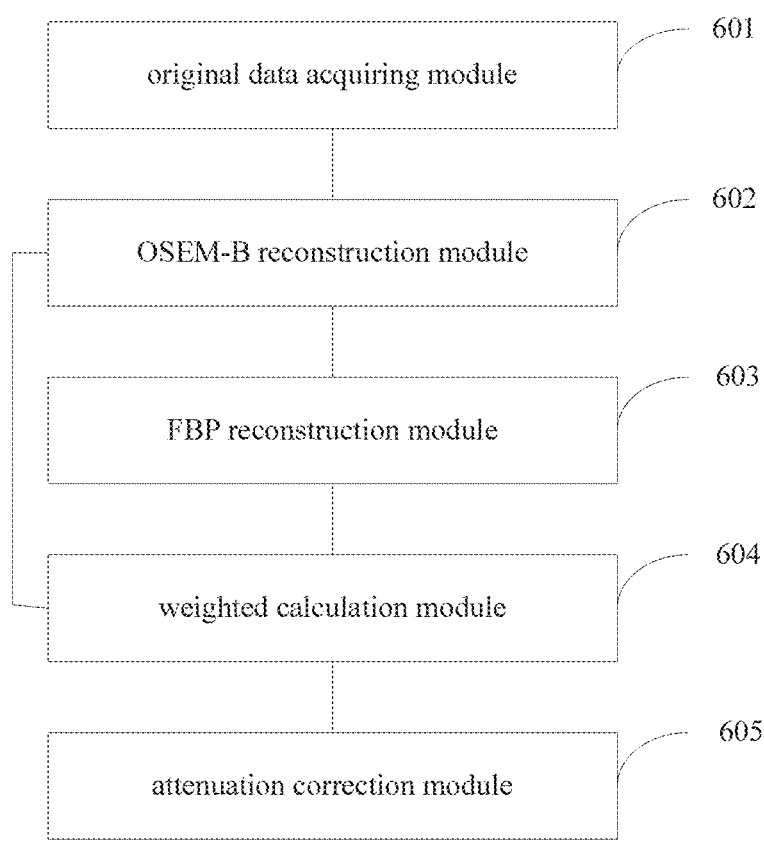
FIG. 6 is a structural schematic diagram illustrating a device according to an embodiment of the present invention.

Corresponding to the above-mentioned embodiment of the method, it is further provided an attenuation correction device for a medical image in a PET system according to the embodiments of the present invention. FIG. 6 shows a structural schematic diagram of an example of an attenuation correction device for a medical image in a PET system. The device may include an original data acquiring module 601, an OSEM-B reconstruction module 602, a FBP reconstruction module 603, a weighted calculation module 604 and an attenuation correction module 605.

The original data acquiring module 601 is configured to acquire transmission scanning sinogram data from a PET apparatus.

Figure 7:
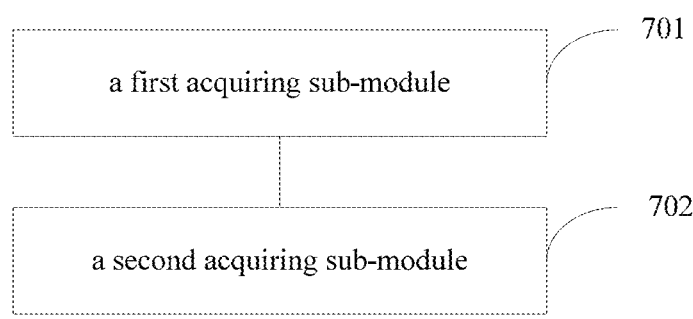
FIG. 7 is a structural schematic diagram illustrating an OSEM-B reconstruction module 602 of a device according to an embodiment of the present invention.

The OSEM-B reconstruction module 602 is configured to reconstruct the transmission scanning sinogram data with OSEM-B algorithm, to obtain an OSEM-B attenuation image, As shown in FIG. 7, the OSEM-B reconstruction module 602 may include:

a first acquiring sub-module 701, configured to obtain a primary attenuation coefficient $\mu_j^{new\_part}$ of a primary attenuation image of the short-time transmission scanning sinogram data by with OSEM algorithm; and a second acquiring sub-module 702, configured to obtain the attenuation coefficient of the OSEM-B attenuation image by combining the primary attenuation coefficient $\mu_j^{new\_part}$ with a Bayesian model $\alpha_j$ according to a formula $\mu_j^{new}=(1-\alpha_j)\mu_j^{new\_part}+\alpha_j\mu_{water}$; where $\mu_{water}$ is the attenuation coefficient of water.

The FBP reconstruction module 603 is configured to reconstruct the transmission scanning sinogram data with FBP algorithm, to obtain a first FBP attenuation image.

The weighted calculation module 604 is configured to perform a weighted calculation on the OSEM-B attenuation image and the first FBP attenuation image to obtain an effective attenuation image.

The weighted calculation module 404 may be configured to:

calculate an effective attenuation coefficient of the effective attenuation image according to a formula $\mu^{Final}=\alpha\mu^{OSEM-B}+(1-\alpha)\mu^{FBP}$ where $\mu^{OSEM-B}$ denotes an attenuation coefficient of the OSEM-B attenuation image, $\mu^{FBP}$ denotes an attenuation coefficient of the FBP attenuation image and $\alpha$ denotes a weighting parameter.

Figure 8:
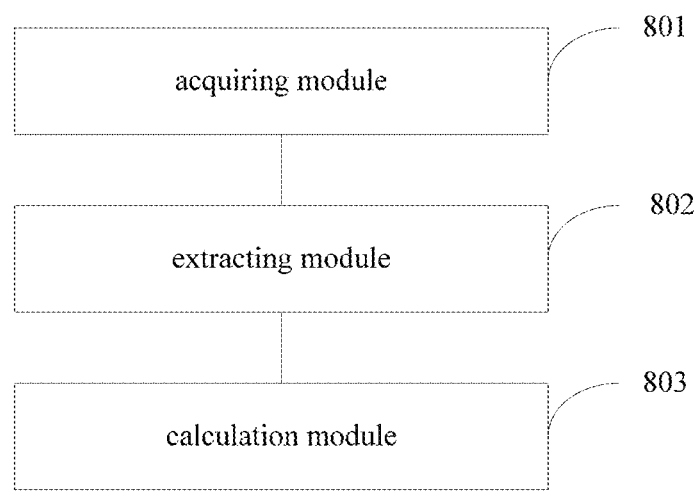
FIG. 8 is a structural schematic diagram illustrating a configuration for calculating a weighting parameter $\alpha$ according to an example of the device according to an embodiment of the present invention.

As shown in FIG. 8, a structural schematic diagram of a configuration for calculating the weighting parameter $\alpha$ in practice is shown, which includes:

an acquiring module 801, configured to acquire sinogram data which is acquired by the PET apparatus performing an inherent noise transmission scanning before delivery; and perform FEP reconstruction on the sinogram data acquired to obtain a second FBP attenuation image;

an extracting module 802, configured to extract a first tissue region from the effective attenuation image and a second tissue region from the second FBP attenuation image; and a calculation module 803, configured to calculate the $\alpha$ by adopting a histogram of the first tissue region and a histogram of the second tissue region.

The calculation module 803 may be configured to calculate the $\alpha$ by adopting a minimum mean square error calculation formula $$\alpha = \min_{\alpha} \|\text{Hist}_{Final} - \text{Hist}_{Long}\|,$$

where $\text{Hist}_{Final}$ denotes the histogram of the first tissue region and $\text{Hist}_{Long}$ denotes the histogram of the second tissue region.

The attenuation correction module 605 is configured to perform attenuation correction on emission scanning sinogram data from the PET apparatus by using an attenuation sinogram generated based on the effective attenuation image.

In the attenuation correction device according to the embodiments of the present invention, the weighted calculation on the OSEM-B attenuation image and the FBP attenuation image may be weighted by the weighted calculation module 604, and the attenuation correction may be performed by adopting the effective attenuation coefficient $\mu^{Final}$ obtained from the weighting. Therefore, even if the transmission scanning lasts for a very short time (8 minutes in the prior art, and only 4 minutes in the embodiment of the invention), the system noise of the emission scanning sinogram data after the attenuation correction may be smaller, and the image precision may be quite close to the image precision in the case that the transmission scanning lasts for 8 minutes in the prior art. Therefore, by means of the weighting, the embodiment of the invention may obtain, by using the short-time transmission scanning sinogram data, an extremely similar result to that in the case of the long-time transmission scanning.

It should be understood that the present invention can be used in many general purpose or special purpose computing system environments or configurations, such as a personal computer, a server computer, a hand-held apparatus or a portable apparatus, a flat panel apparatus, a multiprocessor system, a microprocessor-based system, a set-top box, a programmable consumer electronic apparatus, a network PC, a minicomputer, a mainframe computer and a distributed computing environment including any of the above systems or apparatuses.

The invention may be described in the context of a computer-executable instruction executed by a computer, such as a program module. Generally, the program module includes a routine, a program, an object, a component, a data structures and so on which performs a particular task or implements a particular abstract data type. The invention may also be implemented in a distributed computing environment. In such a distributed computing environment, a task is performed by a remote processing apparatus connected via a communication network. In the distributed computing environment, the program module may be located in local and remote computer storage media including the storage apparatus.

It should be noted that the relationship terminologies such as first and second are only used herein to distinguish an entity or operation from another entity or operation, and it is not necessarily required or implied that there are any actual relationship or order of this kind between those entities and operations. Moreover, the terminologies of 'comprise', 'comprising' and any other variants are intended to cover non-exclusive contains, so that the processes, methods, articles or devices including a series of elements not only include those elements but also include other elements that are not listed definitely or also include the elements inherent in the processes, methods, articles or devices. In the case of no more restrictions, the elements defined by the statement 'comprise one . . . ' do not exclude that other same elements also exist in the processes, methods, articles or devices including the elements.

The embodiments of the device substantially correspond to the embodiments of the method. Therefore, relevant portions may be referred to the description for the embodiments of the method. The above-described embodiments of the device are merely illustrative. A unit described as a separated part may be or may not be physically separated. A part shown in a unit may be or may not be a physical unit, i.e. a part shown in a unit may be located in one place or may be distributed to multiple network units. A part or all of the modules may be chosen as required to achieve the object of the solution of the embodiment. The skilled in the art may understand and implement the invention without creative work.

Those described above are only embodiments of the present invention. It should be noted that, for the skilled in the art, improvements and modifications may also be made without departing from the principle of the invention. Those improvements and modifications should also be included in the scope of protection of the present invention.

The invention claimed is:

1. An attenuation correction method for an image in a Positron Emission computed Tomography (PET) system, comprising:
    acquiring transmission scanning sinogram data from a PET apparatus;
    reconstructing the transmission scanning sinogram data with Bayesian model-based Ordered Subset Expectation Maximization (OSEM-B) algorithm and Filtered Back Projection (FBP) algorithm, to obtain an OSEM-B attenuation image and a first FBP attenuation image respectively;
    performing a weighted calculation on the OSEM-B attenuation image and the first FBP attenuation image to obtain an effective attenuation image; and
    performing attenuation correction on emission scanning sinogram data from the PET apparatus by using an attenuation sinogram generated based on the effective attenuation image.

2. The method according to claim 1, wherein performing a weighted calculation on the OSEM-B attenuation image and the first FBP attenuation image to obtain an effective attenuation image comprises:
    calculating the effective attenuation coefficient of the effective attenuation image by using a formula $\mu^{Final}=\alpha\mu^{OSEM-B}+(1-\alpha)\mu^{FBP}$,
    wherein $\mu^{OSEM-B}$ denotes the attenuation coefficient of the OSEM-B attenuation image, $\mu^{FBP}$ denotes the attenuation coefficient of the FBP attenuation image and $\alpha$ denotes a weighting parameter.

3. The method according to claim 2, wherein obtaining $\alpha$ comprises:
    obtaining sinogram data in performing transmission scanning for inherent noise of the current PET apparatus before a delivery, and performing an FBP reconstruction on the sinogram data obtained in the performing transmission scanning for the inherent noise, to obtain a second FBP attenuation image;
    extracting a first tissue region from the effective attenuation image and a second tissue region from the second FBP attenuation image; and
    calculating $\alpha$ by using a histogram of the first tissue region and a histogram of the second tissue region.

4. The method according to claim 3, wherein calculating $\alpha$ by using a histogram of the first tissue region and a histogram of the second tissue region comprises:
    calculating $\alpha$ by using a minimum mean square error calculation formula $$\alpha = \min_{\alpha}\|\text{Hist}_{Final} - \text{Hist}_{Long}\|,$$

wherein $\text{Hist}_{Final}$ denotes the histogram of the first tissue region and $\text{Hist}_{Long}$ denotes the histogram of the second tissue region.

5. The method according to claim 1, wherein reconstructing the transmission scanning sinogram data with OSEM-B algorithm comprises:
    obtaining a primary attenuation coefficient $\mu_j^{new\_part}$ of a primary attenuation image of the transmission scanning sinogram data with Ordered Subset Expectation Maximization (OSEM) algorithm; and
    combining the primary attenuation coefficient $\mu_j^{new\_part}$ with a Bayesian model $\alpha_j$ according to a formula $\mu_j^{new}=(1-\alpha_j)\mu_j^{new\_part}+\alpha_j\mu_{water}$, to obtain a attenuation coefficient of the OSEM-B attenuation image;
    wherein $\mu_{water}$ denotes the attenuation coefficient of water.

6. An attenuation correction device for an image in a Positron Emission computed Tomography (PET) system, comprising:
    an original data acquiring module, configured to acquire transmission scanning sinogram data from a PET apparatus;
    a Bayesian model-based Ordered Subset Expectation Maximization (OSEM-B) reconstruction module, configured to reconstruct the transmission scanning sinogram data with OSEM-B algorithm, to obtain an OSEM-B attenuation image;
    a Filtered Back Projection (FBP) reconstruction module, configured to reconstruct the transmission scanning sinogram data FBP algorithm, to obtain a first FBP attenuation image;
    a weighted calculation module, configured to perform a weighted calculation on the OSEM-B attenuation image and the first FBP attenuation image to obtain an effective attenuation image; and
    an attenuation correction module, configured to perform attenuation correction on emission scanning sinogram data from the PET apparatus by using an attenuation sinogram generated based on the effective attenuation image.

7. The device according to claim 6, wherein the weighted calculation module is configured to:
    calculate the effective attenuation coefficient of the effective attenuation image by using a formula $\mu^{Final}=\alpha\mu^{OSEM-B}+(1-\alpha)\mu^{FBP}$,
    wherein $\mu^{OSEM-B}$ denotes the attenuation coefficient of the OSEM-B attenuation image, $\mu^{FBP}$ denotes the attenuation coefficient of the FBP attenuation image and $\alpha$ denotes a weighting parameter.

8. The device according to claim 7, wherein modules configured to obtain $\alpha$ comprise:
    an obtaining module, configured to acquire sinogram data which is acquired by the PET apparatus performing an inherent noise transmission scanning before delivery, and perform FBP reconstruction on the sinogram data acquired to obtain a second FBP attenuation image;
    an extracting module, configured to extract a first tissue region from the effective attenuation image and a second tissue region from the second FBP attenuation image; and
    a calculation module, configured to calculate $\alpha$ by using a histogram of the first tissue region and a histogram of the second tissue region.

9. The device according to claim 8, wherein the calculation module is configured to calculate $\alpha$ by using a minimum mean square error calculation formula $$\alpha = \min_{\alpha} \|\text{Hist}_{Final} - \text{Hist}_{Long}\|,$$

wherein $\text{Hist}_{Final}$ denotes the histogram of the first tissue region and $\text{Hist}_{Long}$ denotes the histogram of the second tissue region.

10. The device according to claim 6, wherein the OSEM-B reconstruction module comprises:
   a first obtaining sub-module, configured to obtain a primary attenuation coefficient, $\mu_j^{new\_part}$ of a primary attenuation image of the short-time transmission scanning sinogram data with OSEM algorithm; and
   a second obtaining sub-module, configured to obtain the attenuation coefficient of the OSEM-B attenuation image by combining the primary attenuation coefficient $\mu_j^{new\_part}$ with a Bayesian model $\alpha_j$ according to a formula $\mu_j^{new} = (1-\alpha_j)\mu_j^{new\_part} + \alpha_j\mu_{water}$;
   wherein $\mu_{water}$ denotes the attenuation coefficient of water.

* * * * *